United States Patent [19]

Farnung et al.

[11] Patent Number: 4,998,357

[45] Date of Patent: Mar. 12, 1991

[54] BINOCULAR TELESCOPR WITH RADIALLY ACTING COMPENSATING SPRING

[75] Inventors: H. Peter Farnung, Bad Nauheim; Alfred Hengst, Lahnau; Heinz Keiner, Solms, all of Fed. Rep. of Germany

[73] Assignee: Leica GmbH, Solms, Fed. Rep. of Germany

[21] Appl. No.: 455,143

[22] Filed: Dec. 22, 1989

[30] Foreign Application Priority Data

Dec. 12, 1988 [DE] Fed. Rep. of Germany ... 8815913[U]

[51] Int. Cl.$^5$ .......................... G02B 7/06; G02B 23/00
[52] U.S. Cl. ................................... 350/556; 350/555; 350/564
[58] Field of Search ............... 350/548, 552, 554, 555, 350/556, 564, 565, 563, 255

[56] References Cited

U.S. PATENT DOCUMENTS

| 4,080,042 | 3/1978 | Hornschu et al. | 350/36 |
| 4,329,013 | 5/1982 | Heugst | 350/548 |

FOREIGN PATENT DOCUMENTS

| 108385 | 9/1974 | Fed. Rep. of Germany . | |
| 2316955 | 1/1975 | Fed. Rep. of Germany . | |
| 2288326 | 5/1976 | France | 350/554 |

Primary Examiner—Jon W. Henry
Attorney, Agent, or Firm—Foley & Lardner, Schwartz, Jeffery, Schwaab, Mack, Blumenthal & Evans

[57] ABSTRACT

The binocular telescope has in each barrel a focusing member (internal focusing) which is joined to a support guided on a guide rod. When a control knob is actuated, this support is displaced axially by means of a transmission bar. A driving pin, which engages into the focusing member, is integrally formed on the support for this purpose. A spring which interacts with the driving pin and acts upon the focusing member effects tilt-free guidance and prevents radial play, even with short guide lengths of the focusing member.

5 Claims, 2 Drawing Sheets

BINOCULAR TELESCOPR WITH RADIALLY ACTING COMPENSATING SPRING

BACKGROUND OF THE INVENTION

The invention relates to a binocular telescope with a focusing member in each barrel, which serves for the focusing and which is joined to a support guided in a guide rod and axially displaceable by a transmission bar via a control knob.

A binocular telescope with common focusing of the two individual telescopes is known from DE-AS 2,316,955, in which the optical components serving for the focusing comprise a support, inside the tube, which is axially adjustable by means of a control knob arranged outside. Rotation of the control knob is transmitted, via a screw rod connected thereto, to a transverse web rotatably connected to a rod which, in turn, is fixedly connected to the support. This support consists of a cylinder surrounding the rod, a connecting web and a conical component comprising a focusing-lens support.

By a rod-shaped guide element for the support, a rotation of the focusing lens from out of the optical axis is prevented. However, a guidance free from play and a tilt-free arrangement of the focusing-lens support are not ensured.

A binocular telescope with an articulated bridge and a central focusing device is, furthermore, known from DD-PS 108,385 in which the central focusing shaft is provided in its central region with an external screwthread on which a threaded bush is mounted so as to be adjustable by upward rotation. This threaded bush is joined coaxially and completely secured to a driving gear with which the focusing can be carried out. The threaded bush and the driving gear form an annular groove in which two identical rings, which are provided with a pin, are mounted superposed. These rings engage in bores in the casing of a focusing member. In order to prevent play between pin and bore, the pins have a slot which can be widened accordingly during assembly. This known arrangement requires relatively large guide lengths for the focusing member in the barrel and correspondingly high adjustment forces.

SUMMARY OF THE INVENTION

The object of the present invention is to provide a binocular telescope of the type mentioned at the beginning such that the focusing member is guided free from play and tilt at short guide lengths, even in barrels with a larger diameter, and only low adjustment forces are needed for its displacement, with no additional lubrication being necessary.

This object is achieved according to the present invention by a driving pin, arranged on the support, being engaged with the focusing member and a spring, interacting with the driving pin, acting radially upon the focusing member. In this way, not only is the play eradicated between the focusing member and binocular barrel, and hence the danger of rattling, but tilting errors of the focusing lens are also eliminated. Furthermore short guide lengths are made possible, even with large barrel diameters.

The invention is described in more detail in the following description, by means of two exemplary embodiments represented diagrammatically in the drawings. All components which are not necessary for understanding the invention have been omitted or not described.

DETAILED DESCRIPTION OF THE PREFERRED EMBODIMENTS

Figure 1:
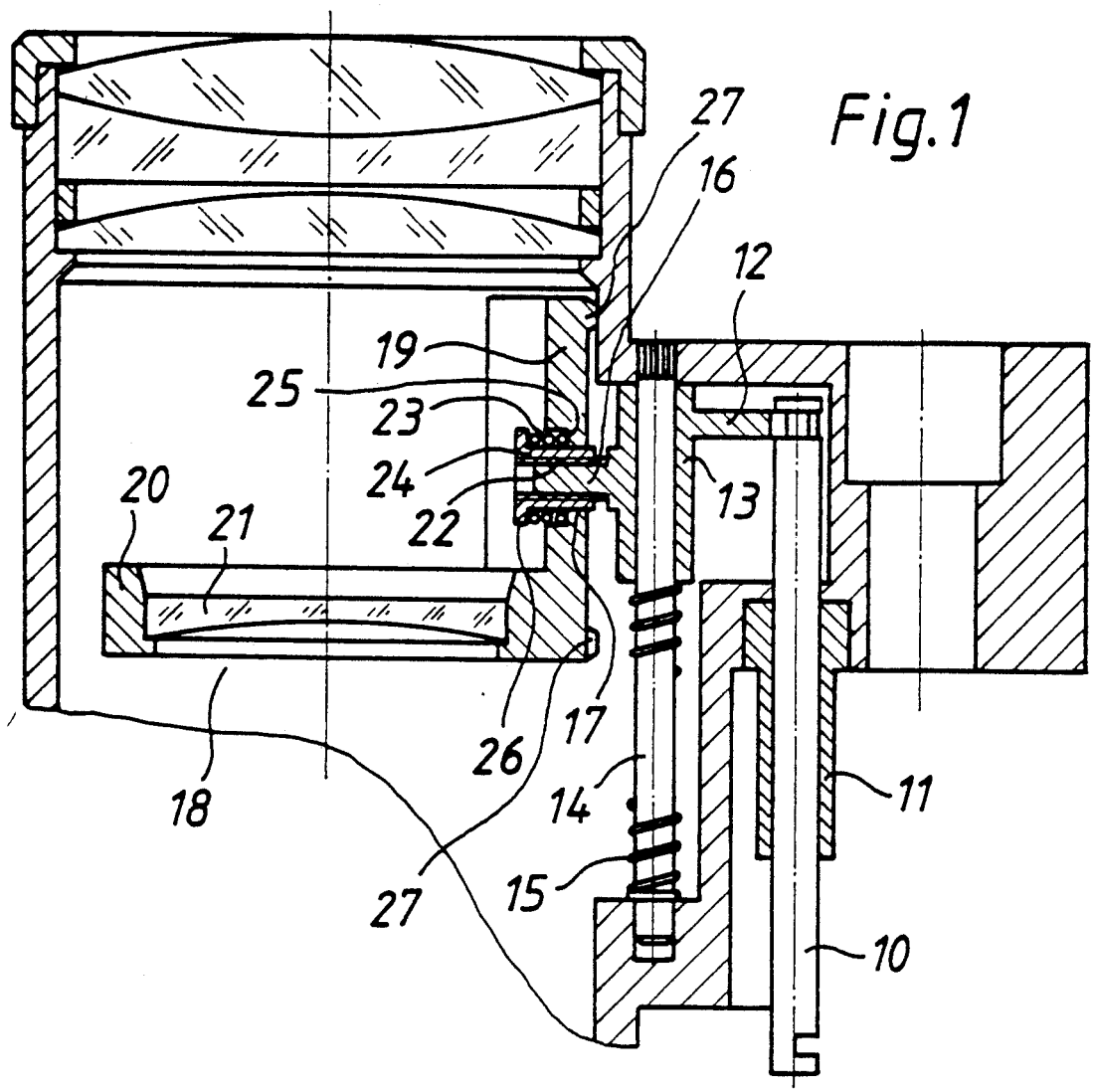
FIG. 1 shows a sectional view of a first embodiment of the invention.

In the telescope half shown in FIG. 1, when a control knob (not shown) is rotated, a transmission bar 10 is displaced in an axial direction in a bearing sleeve 11 secure with the housing. The transmission bar 10 is joined at its upper end by a web 12 to a support 13 which is guided on a guide rod 14 mounted securely to the housing. This guide rod is surrounded by a compensating spring 15 which acts upon the support 13 and to a large extent eliminates the axial play between the individual transmission members, which are not shown here. A driving pin 16, which engages in a focusing member 18 through a bore 17, is integrally formed on the support 13. This focusing member is formed from a partly cylindrical guide element 19 with an integrally formed, annular focusing mount 20 for a focusing lens 21. The driving pin 16 is provided with an external screwthread 22. For reasons of assembly, after the driving pin 16 has been pushed through the bore 17, a pressure spring 23 is first seated on the driving pin 16 and then a bush 24 is screwed onto the external screw thread 22 of the driving pin 16. The pressure spring thus bears on the one hand against a shoulder 25 in the bore 17 of the focusing member 18 and on the other hand against a projecting rim 26 of the driving pin 16, whereby the partly cylindrical guide element 19 sits free of tilt on the inner surface of the barrel and radial play is avoided. The contact pressure can be varied by adjusting the bush 24.

Projections 27 are advantageously integrally formed on the corner sections of the outer surface of the guide element 19. In this way a prismatic guide with low friction is formed in the form of a four-point bearing.

The projections 27 can advantageously be designed so as to be adjustable in pairs in the manner of adjusting screws, so that bearing inaccuracies can be corrected.

Figure 3:
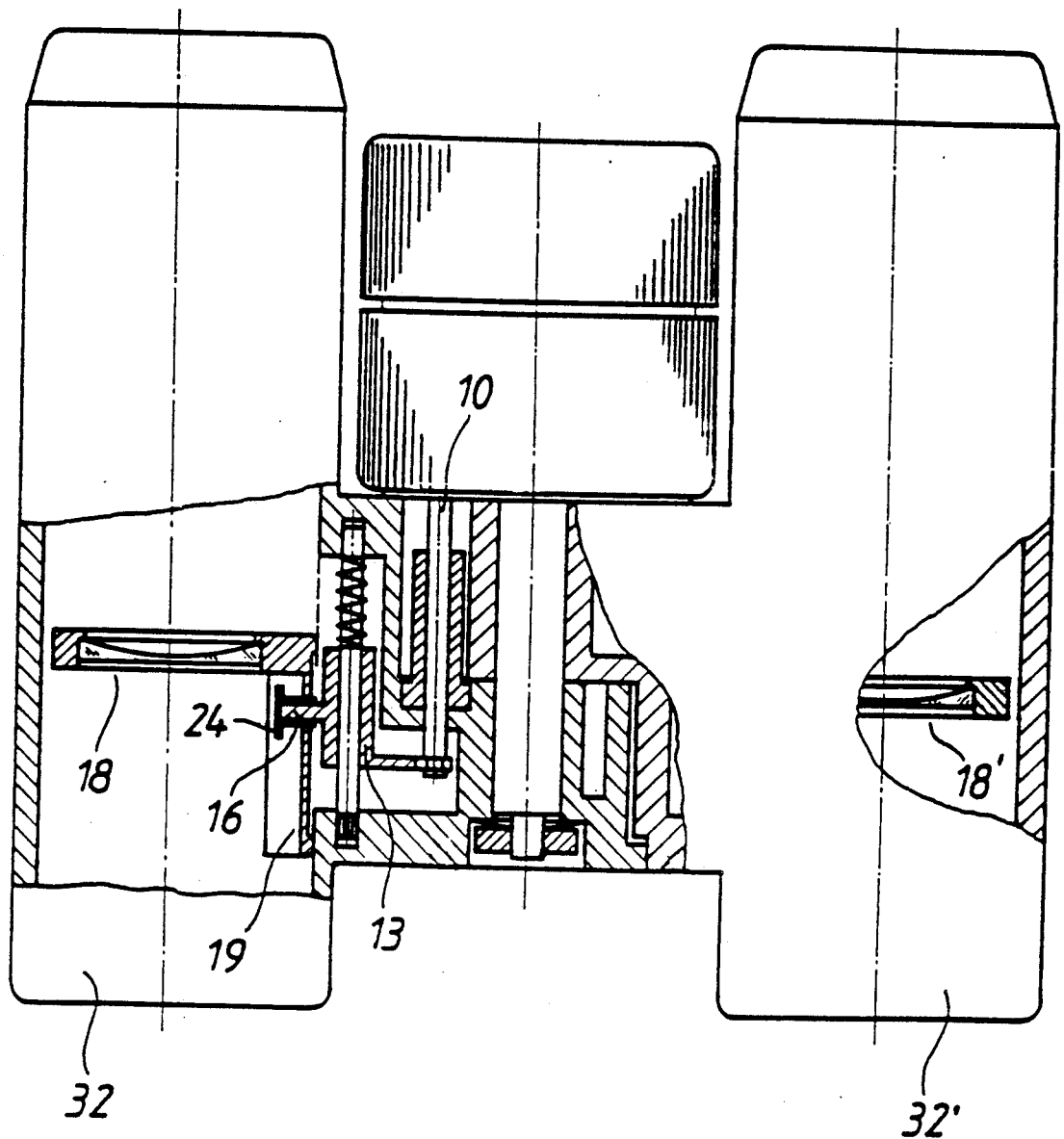
FIG. 3 shows a binocular in a partially sectioned front elevation illustrating the focusing means of FIG. 1.

The binocular shown in FIG. 3, which includes the focusing means of FIG. 1, comprises a left tube 32' and a right tube 32 identical in its configuration with 32', the tubes being connected with each other in a known manner.

Figure 2:
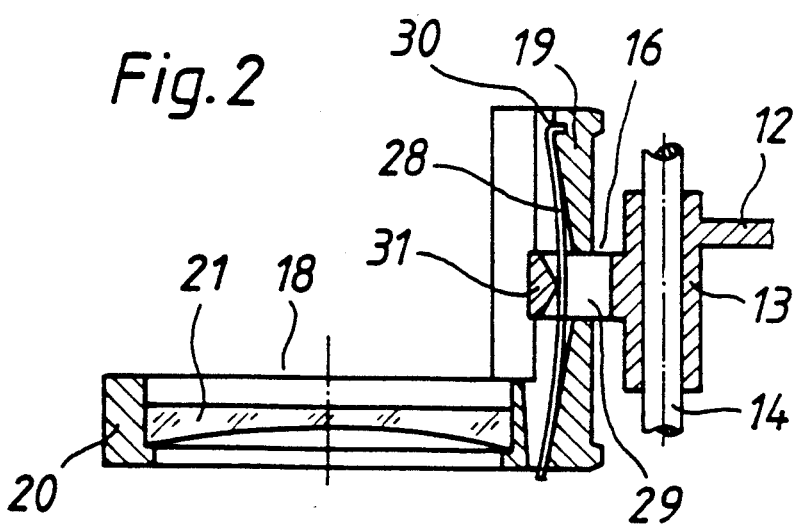
FIG. 2 shows, in section, a second exemplary embodiment.

In the exemplary embodiment shown in FIG. 2, identical reference symbols have been used for identical components. Instead of the pressure spring a slightly curved leaf spring 28 has been provided here, which is inserted into a recess 29 in the driving pin 16 and is secured, to prevent displacement, with an angled end in a slot 30 provided in the guide element 19. A lug 31 in the recess 29 of the driving pin 16 presses the leaf spring 28 with its limbs against the inner surface of the guide element 19 and the latter against the inner surface of the barrel.

What is claimed is:

1. A binocular telescope having at least one barrel and a focusing means for focusing a lens arrangement in the barrel, said focusing means comprising:
  a guide rod;
  a support axially displaceable along said guide rod;
  a transmission bar movable via a control knob for moving said support;
  a driving pin arranged on a support and engaged with a focusing member located in said barrel; and
  a compensating spring means for interacting with the driving pin which acts radially upon the focusing member.

2. The binocular telescope as claimed in claim 1, wherein the driving pin is surrounded by a pressure spring which acts directly upon the focusing member and indirectly upon the driving pin.

3. The binocular telescope as claimed in claim 1, wherein a leaf spring is arranged in a recess in the driving pin which acts upon the focusing member and upon the driving pin.

4. The binocular telescope as claimed in claim 1, wherein the focusing member comprises a partly cylindrical guide element with an integrally formed annular focusing mount means for receiving a focusing lens.

5. The binocular telescope as claimed in claim 4, wherein projections are integrally formed on the corner sections of an outer surface of the guide element, forming a prismatic guide with an inner wall of the telescope.

* * * * *